United States Patent [19]

Chaya et al.

[11] 4,021,379

[45] May 3, 1977

[54] POLYURETHANE FOAM AND METHOD FOR ITS MANUFACTURE

[75] Inventors: John E. Chaya; Charles Bredbenner; Elmer Minnich, all of Hazleton; Francis Branz, Freeland, all of Pa.

[73] Assignee: Tenneco Chemicals, Inc., Saddle Brook, N.J.

[22] Filed: May 19, 1975

[21] Appl. No.: 578,968

[52] U.S. Cl. .................... 260/2.5 AN; 260/2.5 AP
[51] Int. Cl.$^2$ .......................................... C08J 9/14
[58] Field of Search ............... 260/2.5 AN, 2.5 AP, 260/75 NP

[56] References Cited

UNITED STATES PATENTS

| | | | |
|---|---|---|---|
| 3,344,121 | 9/1967 | Phelisse et al. | 260/75 NP |
| 3,404,107 | 10/1968 | Beardon et al. | 260/2.5 AN |
| 3,684,770 | 8/1972 | Meisert et al. | 260/75 NP |

*Primary Examiner*—Melvyn I. Marquis
*Assistant Examiner*—H. H. Fletcher
*Attorney, Agent, or Firm*—James P. Scullin

[57] ABSTRACT

The resiliency and permeability of flexible polyurethane foams prepared from polyether polyols are improved by including a minor proportion of a polyester polyol in the reaction mixture.

10 Claims, No Drawings

POLYURETHANE FOAM AND METHOD FOR ITS MANUFACTURE

BACKGROUND OF THE INVENTION

1. Field of the Invention

This invention relates to high resilience polyurethane foams, and more particularly to the use of minor amounts of certain polyester polyols to improve the resilience of flexible polyurethane foams made from polyether polyols. The high resilience polyurethane foams made according to this invention are obtained directly, without the necessity of mechanical crushing of the cured foam. The method disclosed is especially applicable to the production of free-rise slabstock, but it can also be employed to produce high resilience foam in closed molds, if desired.

2. Description of the Prior Art

Flexible polyurethane foams prepared by the reaction of polyether polyols and organic polyisocyanates in the presence of blowing agents are well known, and have been made commercially in various forms including molded shapes, sheets, and blocks of circular and rectangular cross-section. Such products were found to be of use in a number of applications such as insulation and packaging, but were not completely satisfactory in cushioning applications due to lack of sufficient resilience. Typical uses requiring resiliency include cushions, mattresses, automotive and furniture upholstery, and shoe inner soles.

The deficiency in resilience of polyether polyurethane foams is believed to be due to a number of factors, including the molecular composition of the polyurethane polymer and the fact that the foams contained too high a proportion of closed cells. A great many attempts have been made to overcome the deficiency in resilience. While these have provided some improvements, none has been completely successful and many add unduly to cost by way of more expensive raw materials or additional processing steps.

One of the known means for improving resilience is to subject a foam having a high proportion of closed cells to mechanical crushing, as between a pair of rolls for example. This method causes some of the closed cells to rupture, thus increasing the degree of openness and rendering the structure less tight and more resilient. Although crushing has beeen widely used in the foam industry, it does not improve resiliency to the desired degree and necessitates additional equipment and processing with a consequent increase in cost.

Another approach to improving resiliency is the use of the so-called polymer-polyols such as those described by Patten et al in Journal of Cellular Plastics, November/December 1974, page 276 et seq, as partial or total replacements for conventional polyether polyols. These polymer-polyols are produced by the in situ polymerization of one or more vinyl monomers, such as styrene and acrylonitrile, in the presence of a conventional polyether polyol. Although these materials may provide improved resiliency in foams made under ideal conditions, they have been found to be deficient in processability when used in free-rise slab stock formulations under actual plant conditions.

Various other means for improving resiliency have been disclosed in prior patents. Examples are: the use of an undistilled tolylene diamine phosgenation product having a controlled acidity, disclosed in U.S. Pat. No. 3,801,518 to Irwin et al; the use of a mixture of alkanols of octahydrothieno (3,4-b) pyrazine 6,6-dioxide as chain extenders, as disclosed in U.S. Pat. No. 3,821,132 to Mao et al; the use of polyether polyols capped with urethane or urea end groups, as disclosed by Fabris et al in U.S. Pat. No. 3,823,096; the use of isocyanurate polyols are curing agents for molded foams, as disclosed by Taub in U.S. Pat. No. 3,856,718; the use of a mixture of polyols comprising an ethylene oxide tipped polyester polyol and a large proportion of a second polyester polyol containing at least 40% by weight of oxyethylene groups at least some of which are in non-terminal positions, as disclosed by Fishbein et al in U.S. Pat. No. 3,857,800; and the addition to the reaction mixture of a solid polymer of ethylenically unsaturated monomers free from groups reactive with NCO or OH groups, as disclosed by Blankenship in U.S. Pat. No. 3,869,413.

SUMMARY OF THE INVENTION

This invention is based on the surprising discovery that soft highly resilient polyether polyurethane foams can be directly prepared, without the necessity for introducing a crushing step and without resorting to the use of expensive raw materials, by adding a small proportion of a polyester polyol to a conventional reaction mixture comprising a polyether polyol, an organic polyisocyanate, a blowing agent, one or more chain extenders, a surfactant, and one or more catalysts. Other compounding ingredients well known to the art, such as flame-retardants, dyes, pigments, fillers, antistatic agents, anti-oxidants and so on, can also be included in the reaction mixture is desired.

This discovery is particularly unexpected in view of the facts well known in the art that: (a) polyester polyurethane foams are invariably tighter and more closed-cell than polyether polyurethane foams, and (b) highly resilient polyether polyurethane slabstock foams are generally considered to be the tightest of the polyether polyurethane slabstock foams. Thus it was quite surprising to find that the addition of as little as 0.5 part by weight of a polyester polyol to 100 parts by weight of a polyether polyol markedly improved the ease of foam preparation (i.e. the processing latitude) and improved the physical properties of the foam itself. In the latter regard, the resulting foam was more permeable, more resilient, and did not shrink: thus it was not necessary to crush the foam in order to achieve the desired resiliency nor to avoid shrinkage. The foam was improved in stability, in that the indentation load deflection did not increase during storage.

DETAILED DESCRIPTION OF THE INVENTION

The polyester polyols which are used in the practice of this invention are known in the art and are conventionally used as the sole, or the major, polyols in the preparation of flexible polyester type polyurethanes. These polyesters have a hydroxy functionality, i.e. an average number of hydroxyl groups per molecule, of greater than two and less than three. They can be prepared, for example, by the reaction of dicarboxylic acids with greater than the stoichiometric amount of polyhydric alcohols consisting of a mixture of diols and triols. If desired, polyhydric alcohols containing four or more hydroxyl groups can be used in place of triols, although triols are preferred. Examples of suitable triols are: trimethylolethane; trimethylolpropane; 1,2,4-butanetriol; 1,2,6-hexanetriol; triethanolamine; and glycerol, with the first two named being preferred.

Examples of suitable diols are: neopentyl glycol; ethylene glycol; diethylene glycol; hexamethylene glycol; 1,3 and 1,4-butylene glycol; 1,2- and 1,3-propylene glycol, and the corresponding dipropylene glycols. The polyhydric alcohols and polycarboxylic acid compounds each contain from two to about 36 carbon atoms in the molecule. The polycarboxylic acid includes such acid precursors as the corresponding acid anhydrides or acid halides or even, for example, alkyl esters. Examples of suitable carboxylic acid compounds which can be used include, for example, aromatic acids such as phthalic acid, terephthalic acid, isophthalic acid, tetrachlorophthalic acid, cycloaliphatic acids such as dimerized linoleic acid, maleated and fumarated resin acids, tricarballylic acid, and cyclohexane-1,4-diacetic acid. The preferred acids are the aliphatic dicarboxylic acids containing from about 4 to about 12 carbon atoms in the molecule, such as oxydipropionic, succinic, glutaric, adipic, azelaic, suberic, and sebacic acids, or combinations of such acids. The polyester polyols can also be preferred from corresponding lactones, such as gamma-butyro; or epsiloncaprolactones, for example. The polyhydric polyester polyol usually has a molecular weight of at least about 400 and optimally between about 500 and about 5000. The hydroxyl number of the compound is correspondingly in the range of from about 15 to about 300, and preferably in the range of from about 40 to about 70. Generally a polyester having a molecular weight of greater than about 10,000 is difficult to handle commercially because of the difficulty of completely mixing such a high viscosity compound into the reaction mixture. However, in circumstances where a high molecular weight reactant is desired and where the suitable powerful mixing apparatus is available, the higher molecular weight compound can be used; the only significant limitation is that the compound contain, on the average, more than two active hydrogen groups, preferably hydroxyl groups. The preferred hydroxyl functionality for the polyester polyols is from about 2.2 to 2.8. It is preferred that the polyesters have a low acid number, 3.0 or less, although polyesters with higher acid numbers can be used without departing from the scope of this invention.

It is recognized that certain compounds which are considered by those skilled in the art as polyester resins also contain ether linkages, e.g., esters prepared from dipropylene glycol. However, the primary character of such resins is considered to be that of an ester.

Preferred polyester polyols for use in this invention are those prepared by the reaction of adipic acid, diethylene glycol, and either trimethylolethane or trimethylolpropane, having hydroxyl numbers in the range of from about 48 to about 63, acid numbers in the range of from about 1.0 to about 2.5, and viscosities in the range of from about 18,500 to about 21,500 cps at 25° C.

Although a single polyester polyol is generally employed, mixtures of two or more can also be used. The amount of polyester required is from about 0.5 to about 5 parts by weight per 100 parts by weight of polyether polyol, with from about 1 to about 2 parts being preferred.

The polyether polyols suitable for use in the present invention can be selected from any of the wide variety of polyhydric polyether compounds available and conventionally used by the art for the preparation of flexible polyether-type polyurethanes. The most common polyether polyol compounds, the polyoxyalkylene polyether polyols, are generally prepared by the reaction of an alkylene oxide, such as 1,2-propylene oxide, with a polyhydric alcohol. The polyhydric alcohol can be selected from among the same polyhydric alcohols recited above for use in preparation of the polyester; preferably, however, a higher average functionality is useful for a polyether polyol. Therefore, a higher proportion of trihydric polyols, such as glycerol, trimethylolethane and trimethylolpropane is used in the mixture of polyhydric alcohols used to prepare the polyether polyols.

The alkylene oxides used in preparing the polyethers preferably are those which contain from two to about four carbon atoms, for example, ethylene oxide, 1,2-propylene oxide and 1,2-butylene oxide, and homopolymers and copolymers thereof. Other reactants can also be used in preparing the polyhydric polyalkylene ether, such as glycidol and cyclic ethers like di- and tetramethylene ethers, and epihalohydrins, e.g., epichlorohydrin.

Also useful are the polyaralkylene ether polyols which are derived from the corresponding aralkylene oxides such as for example styrene oxide, alone or mixed with alkylene oxide.

Generally, a triol reacted with mixtures of 1,2-propylene oxide and ethylene oxide are preferred for the preparing of the polyether polyol reactant.

The polyethers for use in the present invention preferably have a molecular weight of from about 4000 to about 6500 and a hydroxyl functionality of from about 2.6 to about 3.5. A single polyether polyol or mixtures of two or more can be used.

The organic polyisocyanates useful in the present invention are aromatic isocyanates which contain at least two isocyanate groups per molecule. Single polyisocyanates can be used, but mixtures are generally employed. Preferably, the isocyanate mixture selected has an isocyanate functionality of from about 2 to about 3.0.

Suitable organic polyisocyanates include, for example, m-xylylene diisocyanate, p-xylene diisocyanate, diphenylmethane-4,4'-diisocyanate, m-phenylene diisocyanate; p-phenylene diisocyanate, 3-(alpha-isocyanatoethyl)-phenyl isocyanate, 2,6-diethylbenzene-1,4-diisocyanate, diphenyldimethylmethane-4,4'-diisocyanate, 2,4-toluene diisocyanate, 2,6-toluene diisocyanate, 3,3'-dimethyl-4,4'-biphenylene diisocyanate, 3,3'-dimethoxy-4,4'-biphenylene diisocyanate, 3,3-diphenyl-4,4'-biphenylene diisocyanate, 4,4'-biphenylene diisocyanate, 3,3'-dichloro-4,4'-biphenylene diisocyanate, and 1,5-naphthylene diisocyanate.

Preferably, in the preparation of high resilience polyether polyurethane foams, the organic polyisocyanate will be a mixture of the type referred to as "adducts of TDI", "polymeric TDI", "oligimeric TDI", mixtures of isocyanurate with TDI, allophanate-biuret-carbodiimide derivatives in the TDI used to make them (made by reacting TDI with minor amounts of an alcohol, or water, or an amine), or "TDI-rich quasi-prepolymer", these terms being well recognized by those skilled in the art ("TDI" denoting tolylene diisocyanate). "Adducts of TDI" may be, for example, an adduct of TDI with a polyol such as trimethylolpropane.

It is also within the scope of the present invention to use "crude TDI", either along or enriched with a diisocyanate such as 2,4- or 2,6- tolylene diisocyanate. The term "crude TDI" refers to the material obtained by reacting phosgene with an appropriate diaminotoluene, without substantial purification. The product is believed to contain materials of polyurea and polybiuret structure.

The preferred blowing or foaming agent for general use in the production of polyurethane foam is water. The advantages of using water are low cost and the stability which the use of water adds to the foam-making. The water-isocyanate reaction gives not only gas for blowing, but urea-containing polymer very quickly, contributing materially to early polymer strength needed to hold the gas inside, to form foam. Generally, when water is used, it is present in proportions of from about 0.5 to about 6 weight percent of water based on the total weight of the reacting polyols. Blowing agents which do not react with the isocyanate can be used as an adjunct with water. These are organic compounds which are vaporized at the temperatures produced by the exotherm of the isocyanate-reactive hydrogen reaction. Such volatile organic blowing agents are well known in the art and include certain halogen-substituted aliphatic or cyclo-aliphatic hydrocarbons having boiling points between about −40° C. and +70° C., including methylene chloride, the Freon fluorocarbons, such as trichloromonofluoromethane, dichlorodifluoromethane, and 1-chloro-2-fluoroethane; low boiling hydrocarbons such as n-propane, cyclopropane, butane, isobutane, pentane, hexane, cyclohexane and their mixtures, and the like. In the present invention, either water alone or water and an organic blowing agent can be used.

In the production of supersoft, or very low density, flexible polyurethane foam it will generally be necessary to include in the reaction mixture one of the auxiliary blowing agents discussed above, in addition to water. As those skilled in the art will recognize, the amount of such auxiliary blowing agent to be used will depend on a number of factors, including the density desired in the finished foam, the boiling point of the blowing agent, and the temperature reached in the reaction mass, and may range from as little as 1 part by weight to 30 parts by weight, or more, per 100 parts by weight of polyether polyol.

In order to obtain higher strength and compression load values, and to increase reactivity of the reaction mixture for better processibility, low molecular weight, reactive, compounds termed chain extenders are included in the polyurethane foam formulations of the present invention. Examples are difunctional amines such as diethanolamine, aromatic polyamines such as the condensation products of o-chloroaniline with formaldehyde, certain specialty polyols sold as proprietary products for this purpose (such as NIAX LA-700, sold by Union Carbide), and others which are well known in the art. The simple amines such as diethanolamine will generally be used in amounts up to about 5 parts by weight per 100 parts by weight of polyether polyol, whereas the higher molecular weight chain extenders such as the o-chloroaniline/formaldehyde condensates may be used at somewhat higher levels, up to about 12 parts per weight per 100 parts by weight of polyether polyol. The exact levels for optimum results may be higher or lower than the amounts given illustratively above, depending on the total composition as will be recognized by those skilled in the art. A single chain extender or a combination of two or more can be employed.

It is conventional in the art to utilize a foam-stabilizing emulsifier-surfactant and foaming agent in balanced proportions to obtain a foam of a desired cell size, structure and density.

The foam-stabilizing emulsifier-surfactants used in the present invention are organo-silicon compounds, usually polymers, which are soluble in polyols. Such organo-silicon emulsifier-surfactants are well known to the art, described extensively in the published literature, and sold commercially. The commercially available organo-silicon emulsifier-surfactants are sold with specific instructions as to their suitability for polyether polyol or polyester polyol urethane foam production. Generally, an emulsifier-surfactant suitable for one polyol type is not suitable for use in a foaming reaction based on the other type. Further, these emulsifier-surfactants are proprietary products, sold without disclosure as to their precise chemical structure. However, the emulsifier-surfactant used for polyether polyol-containing reaction mixtures are known to depress the surface tension to a greater extent than do the organo-silicon surfactants used with polyester polyols.

The most generally available organo-silicon emulsifier-surfactants are polymers which contain a plurality of silicon atoms (which form part of the hydrophobic portion of the polymer molecule) and a long chain hydrophilic group, for example a polyoxyalkylene ether group. In the more common organo-silicon emulsifier-surfactant compounds, the silicon is present as a siloxane group, i.e., -Si-O.

A wide variety of molecular structures incorporating these two necessary elements, i.e., the long chain hydrophilic group and silicon atoms, have been used. For example, a first type of structure is a polymer containing a chain of siloxane groups, i.e.,

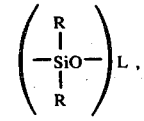

wherein L represents the number of siloxane groups, forming a backbone or spine of the molecule, to which are attached as pendant, or branched chains, one or more long chain hydrophilic groups, i.e., as one of the R groups. In a second type of structure, a chain of alternating siloxane and hydrophilic, e.g. oxyalkylene, groups form a backbone or spine of the molecule. In a third, somewhat less common, type, the molecular spine is formed by a carbon chain, to which is attached pendant groups containing a silicon atom and a long chain hydrophilic group.

Other connecting groups can also be present in the above types of silicon-hydrophilic group-containing polymers; these include, for example, alkylene groups, carboxyl groups, carbamyl groups and amino groups.

Other organo-silicon emulsifier surfactants are disclosed in Canadian Pat. Nos. 873,390, 860,995, 849,038, and 851,239; U.S. Pat. Nos. 3,541,031; 3,404,105; 3,230,185; 3,278,465; 3,577,362; and 3,165,843. U.S. Pat. Nos. 873,390; 3,404,105; 3,278,465; 3,230,188; and 3,165,843 (Example 4) especially show those polymers particularly adapted to use as emusilfier-surfactants with polyether polyols.

Another type of organo-silicon surfactant which can be used in conjunction with, or as a replacement for, the hydrophilic organo-silicon emulsifier-surfactants described above is a low molecular weight polymer of a dialkylsiloxane. Suitable polymers of this type will have a viscosity at 25° C of 10 cs, or less. A preferred surfactant is a polydimethylsiloxane having a viscosity of 5 cs at 25° C.

The amount of organo-silicon surfactant will generally range from about 0.01 to about 2 parts by weight per 100 parts by weight of polyether polyol.

Other non-silicon foam-stabilizing emulsifiers for polyurethane foams can be used in combination with the organo-silicon surfactants described above, if desired, in the present invention. Such useful emulsifiers include, for example, nonionic surfactants such as ethoxylated fatty acids and ethoxylated alkylphenols, and anionic surfactants such as sodium lauryl sarcosinate and various oil-soluble sulfonates.

Commercially, a catalyst is usually employed in the process of preparing a foamed polyurethane. Often, a combination of two catalysts is used to catalyze separate reactions which occur when using water as the foaming agent. A first catalyst is for the polymerization reaction between the isocyanate and the hydroxyl compound, and a second catalyst is for the blowing reaction between water and the isocyanates. The various catalysts useful for each type of reaction are well known in the art. It is commonly understood that tertiary amines are effective for and tend to favor reaction of isocyanate with water; and that metal salts, and complexes, favor the polymerization reaction with the polyol.

The most common metal catalysts include tin compounds and iron compounds. Other metal compounds which can be used include compounds of cobalt, lead, vanadium, chromium, tungsten, antimony, and titanium.

Examples of tertiary amine catalysts include triethylenediamine, N-ethylmorpholine, N, N, N', N'- tetramethyl-1,3-butanediamine, and bis 2-(N,N-dimethylamine) ethyl ether and other such compounds.

Useful tin compounds include stannous salts, e.g., stannous octoate and stannous oleate, and the covalently linked organotin compounds such as dibutyltin diacetate and tributyltin oxide. Mixtures of the tertiary amines are frequently used commercially as are mixtures of tertiary amine catalysts and tin compounds.

Although tin, or other metal, catalysts can be used in the practice of the present invention, it is preferred to use one or more tertiary amines in the absence of metal-containing catalysts. It is particularly preferred to use triethylenediamine as the catalyst. The catalyst levels used in carrying out this invention are conventional and will generally range from about .05 to about 2 parts by weight per 100 parts by weight of polyether polyol. Preferably, the catalyst levels will be between about 0.1 to about 1 part by weight per 100 parts by weight of polyether polyol.

Thus in its broadest aspect, this invention provides an improved means for obtaining a high resilience polyether polyurethane foam which comprises the addition of a minor amount of a polyester polyol to a conventional high resilience foam formulation comprising a polyether polyol, an organic polyisocyanate, a blowing agent, an organo-silicon foam-stabilizing emulsifier-surfactant, one or more chain extenders, and a catalyst, the amount of polyester polyol ranging from about 0.5 to about 5 parts by weight per 100 parts by weight of polyether polyol.

In another, and preferred emblidment of the invention, a flame-retardant is also included in the reaction mixture in order to improve the resistance of the finished foam to burning when exposed to flame or other high-temperature ignition source. For this purpose, any of the flame-retardant additives conventionally used in the preparation of flexible polyurethane foams can be used. Among these conventional additives, the most widely used are halogenated organic compounds of phosphorus such as: tris(2-chlorothyl) phosphate; tris(2,3-dibromopropyl) phosphate; tris(2,3-dichloropropyl) phosphate; and tris(1,3-dichloropropyl-2) phosphate.

The preferred flame-retardant for use in the present invention is tris(1,3-dichloropropyl-2) phosphate.

The amount of flame-retardant will be that required to impart the desired degree of flame-retardancy to the particular foam formulation being used. As will be apparent to those skilled in the art, the amount to be used will depend on the efficiency of the flame-retardant as well as the foam formulation. The amount may be as little as 2 parts and as much as 30 parts by weight, or more, per 100 parts by weight of polyether polyol. When tris(1,3-dichloropropyl-2) phoshate is employed, the effective amount will range from about 4 to about 8 parts per 100 parts of polyether polyol.

The high-resilience polyurethane foam compositions of this invention can be prepared by any known method, including the one-shot, prepolymer, and quasi-prepolymer techniques, for the production of either molded products or free-rise continuous slabstock. These compositions are particularly suitable for making continuous slabstock by the one-shot method.

The following are examples of the process and the product prepared therefrom according to this invention. They are to be taken as illustrative, but not limitative, of the scope of the invention and merely set out certain preferred embodiments thereof. In these examples, all parts are parts by weight.

Example 1

The following materials were fed to a conventional foaming apparatus to form, continuously, a rectangular bun of polyurethane foam having 30 inch sides.

| INGREDIENTS | PARTS |
|---|---|
| Polyether triol containing primary and secondary hydroxyls, molecular weight 6000, hydroxyl no. 28 | 100.0 |
| Adduct of TDI, equiv. wt. 105 (E-378, sold by Mobay Chem. Co.) | 43.2 |
| Trichlorofluoromethane | 25.0 |
| L-5305 silicone surfactant* | 0.25 |
| Amine-type chain extender | 1.85 |
| Triethylenediamine, 33% solution in dripropylene glycol | 1.0 |
| Water | 2.90 |
| Tris(1,3-dichloropropyl-2) phosphate | 5.0 |
| Polyester polyol derived from adipic acid, diethylene glycol, and trimethylolpropane; hydroxyl no. 52, acid no. 1.5, viscosity 20,000 cps. at 25° C | 1.0 |

*sold commercially by Union Carbide Corp. for use in polyether foam

The index of this example was 100. The reaction mixture processed without problems: the foam set up well, and there was no shrinkage. The following physical properties were measured on the finished and cured foam.

| | |
|---|---|
| Density, pcf | 1.10 |
| ILD, 2 in., 25% | 2.7 |
| 65% | 6.8 |
| Modulus, 2 in. 65/25 | 2.52 |
| ILD, 4 in., 25% | 3.8 |
| 65% | 7.8 |
| Modulus, 4 in., 65/25 | 2.05 |
| % Resilience | 55.6 |
| Air permeability, cfm | 9.2 |
| Tensile Strength, psi | 4.5 |
| % Elongation | 109 |
| Tear strength, lb/in. | 0.7 |
| Compression set, 90%, 22 hr. | 58.1 |
| 90%, 6 hr. | 32.7 |
| Flammability, ASTM 1692-74 | |
| Burn time, sec. | 7.2 |
| Burn extent, in. | 0.54 |

Example 1, illustrative of one of the preferred embodiments of the invention, provided a supersoft, resilient, flame-retardant flexible foam of fine and uniform cell structure without the necessity for crushing. The ILD of this foam did not increase during storage at room temperature (20°–25° C).

The procedure of Example 1 was repeated, using the same formulation with the exception of the polyester polyol concentration. In Example 2, the polyester content was 1 part as in Example 1; in Example 3 the polyester content was 0.5 part; and in Example 4, the polyester was entirely omitted.

The product of Example 2 was essentially equal to the product of Example 1 in all respects. The product of Example 3, containing 0.5 part polyester, was a soft and resilient foam, but exhibited very slight shrinkage. The product of Example 4, a comparative example made according to the prior art, showed extensive shrinkage and was noticeably less resilient than the foams of Examples 2 and 3.

EXAMPLES 5–8

The following materials were fed to a conventional continuous foaming apparatus, as in Example 1:

| INGREDIENTS | PARTS | | | |
|---|---|---|---|---|
| | 5 | 6 | 7 | 8 |
| Polyether triol molecular weight 4000, hydroxyl no. 34 | 100.0 | 100.0 | 100.0 | 100.0 |
| Adduct of TDI, equiv. wt. 105 (E-378, sold by Mobay Chem. Co.) | 61.3 | 61.3 | 61.3 | 61.3 |
| Poly(dimethylsiloxane), viscosity 5 cs at 25° C | 0.02 | — | — | — |
| L-5303 silicone surfactant* | — | 1.0 | — | — |
| B-3207 silicone surfactant** | — | — | 0.5 | — |
| Chain extender | 9.25 | 9.25 | 9.25 | 9.25 |
| Triethylenediamine, 33% solution in dipropylene glycol | 0.4 | 0.4 | 0.4 | 0.4 |
| Water | 2.9 | 2.9 | 2.9 | 2.9 |
| Tris(1,3-dichloropropyl-2) phosphate | 5.0 | 5.0 | 5.0 | 5.0 |
| Polyester polyol derived from adipic acid, diethylene glycol, and trimethyolethane; hydroxyl no. 56; acid no. 2.0; viscosity 19,500 cps at 25° C | 3.0 | 3.0 | 3.0 | 3.0 |

*sold commercially by Union Carbide Corp, for use in polyether foam
**sold commercially by Goldschmidt, for use in polyether foam The following physical properties were determined in the cured foams:

| | 5 | 6 | 7 | 8 |
|---|---|---|---|---|
| Density, pcf | 2.50 | 2.40 | 2.58 | 2.37 |
| % Resilience | 61.2 | 62.5 | 61.2 | 65.3 |

| | 5 | 6 | 7 | 8 |
|---|---|---|---|---|
| Permeability, cfm | 2.7 | 2.6 | 2.1 | 4.3 |

The product of Example 8, made without silicone emulsifier-surfactant, was soft and resilient but had a coarse, non-uniform, cell structure. The rectangular bun as made was observed to have a bad bottom and sides, and to exhibit slight settling. Examples 5–7 processed well, were soft and resilient, and had a uniform cell structure which met commercial requirements.

EXAMPLES 9 – 23

Example 5 was repeated, but with different esters replacing the three parts of the polyester polyol. Example 23 was a comparator, without ester.

| Example | Ester | Parts |
|---|---|---|
| 9 | Linear polyester derived from 1,3-butanediol and adipic acid, hydroxyl no. 61 | 2.5 |
| 10 | " | 5.0 |
| 11 | Partially hydrolyzed castor oil, hydroxyl no. 340 | 2.5 |
| 12 | " | 5.0 |
| 13 | Di(2-ethylhexyl) phthalate | 2.5 |
| 14 | " | 5.0 |
| 15 | Butyl oleate | 2.5 |
| 16 | " | 5.0 |
| 17 | Stearyl methacrylate | 2.5 |
| 18 | " | 5.0 |
| 19 | Epoxidized soybean oil | 2.5 |
| 20 | " | 5.0 |
| 21 | Diacetylated polyester derived from 1,3-butanediol and adipic acid | 2.5 |
| 22 | " | 5.0 |
| 23 | none | — |

None of the foams from Examples 9–22 showed any improvement in either processability or resilience as compared with the foam from Example 23. All of the foams from Examples 9–23 exhibited some shrinkage, indicative of an undesirably high proportion of closed cells, and were noticeably inferior in resilience to the product of Examples 5, 6 and 7.

Examples 9–22 illustrate that linear polyesters (without branching) having a high hydroxyl number, linear polyesters which have been capped with acetyl groups, simple esters of alcohols and mono- or di-basic acids, and partial or complete glyerol esters of monobasic acids are all ineffective in improving the resilience of polyether polyurethane foam.

EXAMPLES 24-28

| INGREDIENTS | 24 | 25 | PARTS 26 | 27 | 28 |
|---|---|---|---|---|---|
| Polyether triol, mol. wt. 4000, hydroxyl no. 34 | 100.0 | 100.0 | 100.0 | 100.0 | 100.0 |
| Adduct of TDI, equiv. wt. 105 (E-378, Mobay Chem. Co.) | 61.5 | 61.5 | 61.6 | 61.0 | 61.0 |
| Poly(dimethylsiloxane), visc. 5 cs at 25° C | 0.02 | 0.02 | 0.02 | — | 0.02 |
| Chain extender | 9.25 | 9.25 | 9.25 | 9.25 | 9.25 |
| Triethylenediamine, 33% solution in diethylene glycol | 0.4 | 0.4 | 0.4 | 0.4 | 0.4 |
| Water | 2.9 | 2.9 | 2.9 | 2.9 | 2.9 |
| Tris(1,3-dichloropropyl-2) phosphate | 5.0 | 5.0 | 5.0 | 5.0 | 5.0 |
| Polyester polyol from adipic acid, diethylene glycol, and trimethylolpropane, hydroxyl no. 52 | 5.0 | — | — | — | — |
| Polyester polyol from adipic acid, diethylene glycol, and trimethylolethane, hydroxyl no. 56 | — | 5.0 | — | — | — |
| Polyester polyol from adipic acid, diethylene glycol, and trimethylolethane, hydroxyl no. 61 | — | — | 5.0 | — | — |

Examples 24-28 were prepared by the method used for Example 1.

The following physical properties were measured:

|  | 24 | 25 | 26 | 27 | 28 |
|---|---|---|---|---|---|
| Density, pcf | 2.63 | 2.51 | 2.47 | 2.41 | 2.53 |
| Resilience, % | 59.8 | 59.8 | 63.9 | 57.0 | 51.4 |

The products of Examples 24-26, made according to the present inventions, were judged to be good foams, showing no shrinkage and having a uniform cell structure. The product of comparative Example 27 showed top skin shrinkage and a coarse, uneven, cell structure. As shown in the foregoing table, it was deficient in resilience. The product of comparative Example 28 showed bad top skin shrinkage; and as shown in the foregoing table the foam was substantially deficient in resilience.

EXAMPLE 29

Example 1 was repeated, except that the tris(1,3-dichloropropyl-2) phosphate was left out. The foam processed well and showed no shrinkage. The product was essentially equivalent to the product of Example 1 in resilience, air permeability, and other physical properties, but it was not flame-retardant.

EXAMPLES 30-33

Example 1 is repeated, except that the adduct of TDI (E-378) is replaced by an equivalent weight of: polymeric TDI (Example 30); a mixture of isocyanurate and TDI (Example 31); TDI containing allophanate, biuret and carbodiimide derivatives (Example 32); and crude TDI (Example 33). The foams process without problems and without shrinkage. The finished and cured foams were highly resilient and flame-retardant, essentially the same as the product of Example 1.

What is claimed is:

1. In a process for the preparation of a flexible polyurethane foam from a reaction mixture comprising a polyether polyol having a hydroxyl functionality of greater than two, an organic aromatic polyisocyanate, a blowing agent, at least on chain extender, an organosilicon emulsifier surfactant, and a catalyst, the improvement which comprises the addition to the reaction mixture of a polyester polyol having a hydroxyl functionality of greater than two and less than three in amounts of from about 0.5 to about 5 parts by weight per 100 parts by weight of said polyether polyol, whereby the ease of foam preparation is improved and a foam of increased resilience and stability is obtained.

2. The process of claim 1 wherein the amount of polyester polyol is from about 1 to about 2 parts by weight per 100 parts by weight of said polyether polyol.

3. The process of claim 1 wherein the polyester polyol is a polyester prepared from the reaction of adipic acid, diethylene glycol, and trimethylolpropane; and has a hydroxyl number of from about 48 to about 52, an acid number of from about 1.0 to about 2.0, and a viscosity of from about 18,500 to about 21,500 cps at 25° C.

4. The process of claim 1 wherein the polyester polyol is a polyester prepared from the reaction of adipic acid, diethylene glycol, and trimethylolethane; and has a hydroxyl number of from about 52 to about 63, an acid number of from about 1.5 to about 2.5, and a viscosity of from about 19,000 to about 21,000 cps at 25° C.

5. The process of claim 1 wherein the blowing agent is water.

6. The process of claim 1 wherein the blowing agent is a combination of water and a volatile organic blowing agent.

7. The process of claim 1 wherein the reaction mixture also comprises an organic flame-retardant.

8. The process of claim 7 wherein: the polyether polyol is a polyether triol having a molecular weight of about 6000 and a hydroxyl number of about 28, and which contains both primary and secondary hydroxyl groups; the organic polyisocyanate is an adduct of tolylene diisocyanate; the blowing agent is a combination of water and trichlorofluoromethane; the catalyst is triethylenediamine; the organic flame-retardant is tris(1,3-dichloropropyl-2) phosphate; and the polyester polyol is a polyester prepared from the reaction of adipic acid, diethylene glycol, and trimethylolpropane.

9. A high-resilience, flexible, polyurethane foam which comprises the reaction product of a mixture of a polyether polyol having a hydroxyl functionality of greater than two, a minor amount of a polyester polyol having a hydroxyl functionally greater than two and less than three, an organic aromatic polyisocyanate, a blowing agent, at least one chain extender, an organosilicon emulsifier-surfactant, and a catalyst, the amount of said polyester polyol being from about 0.5 to about 5 parts by weight per 100 parts by weight of said polyether polyol.

10. A high-resilience, flexible, polyurethane foam according to claim 9 that is made flame-retardant by the inclusion of a halogenated phosphate ester in the reaction mixture.

* * * * *